United States Patent [19]

Komiya

[11] Patent Number: 4,481,588

[45] Date of Patent: Nov. 6, 1984

[54] METHOD AND APPARATUS FOR ADJUSTING INSTALLATION POSITION OF SWITCH MEMBERS IN NUMERICAL CONTROL SYSTEM

[75] Inventor: Hidetsugu Komiya, Hino, Japan

[73] Assignee: Fanuc Ltd., Tokyo, Japan

[21] Appl. No.: 314,469

[22] Filed: Oct. 23, 1981

[30] Foreign Application Priority Data

Oct. 30, 1980 [JP] Japan ................................. 55-152697

[51] Int. Cl.³ ............................................ G06F 15/46
[52] U.S. Cl. .................................... 364/474; 364/174; 318/626; 318/651; 318/672; 377/17
[58] Field of Search ............... 364/167, 174, 182, 474; 318/603, 626, 627, 651, 652, 659, 660, 672, 673; 377/17

[56] References Cited

U.S. PATENT DOCUMENTS

| | | | |
|---|---|---|---|
| 3,602,700 | 8/1971 | Jerva | 377/17 |
| 3,629,560 | 12/1971 | Slawson | 364/474 |
| 3,795,853 | 3/1974 | Whitehouse | 318/626 |
| 3,836,833 | 9/1974 | Horris et al. | 318/603 |
| 3,976,929 | 8/1976 | Rodier | 318/594 |
| 4,112,291 | 9/1978 | Fukuyama et al. | 318/603 |
| 4,242,621 | 12/1980 | Spaulding | 318/626 |
| 4,258,301 | 3/1981 | Kawa | 318/594 |
| 4,259,627 | 3/1981 | Matsuno et al. | 318/626 |
| 4,266,172 | 5/1981 | Yamazaki | 364/474 |
| 4,350,941 | 9/1982 | McClure et al. | 318/603 |

*Primary Examiner*—Joseph F. Ruggiero
*Assistant Examiner*—John R. Lastova
*Attorney, Agent, or Firm*—Staas & Halsey

[57] ABSTRACT

A method and apparatus for adjusting the positions of switch members such as a deceleration limit switch installed on a machine tool in a numerical control system for controlling the machine tool on the basis of numerical control data and for executing predetermined numerical control processing on the basis of signals produced by the switch members. When the switch member such as a limit switch is actuated, a display device displays the current position of a movable member on the machine tool, or a numerical value corresponding to the current position of the movable member. Whether the switch member is installed on the machine tool at the correct position is determined on the basis of the displayed current position or numerical value corresponding thereto. When it is determined that the switch member is installed at an incorrect position, the switch member is positionally adjusted on the basis of the indication given by the display device.

9 Claims, 5 Drawing Figures

METHOD AND APPARATUS FOR ADJUSTING INSTALLATION POSITION OF SWITCH MEMBERS IN NUMERICAL CONTROL SYSTEM

BACKGROUND OF THE INVENTION

This invention relates to a method and apparatus for adjusting the installation position of switch members in a numerical control system and, more particularly, to a method and apparatus for adjusting the position at which a zero-point return dog or deceleration limit switch or the like is installed in a numerically controlled machine tool.

In a numerically controlled machine tool of the type which uses a device such as a pulse coder or resolver as a position sensor, a so-called zero-point return dog and a deceleration limit switch are provided in order to return a movable machine member, such as a table, to a zero point. The zero-point return dog is installed on the movable member at a predetermined position, and the deceleration limit switch is installed on a stationary portion of the machine tool at a point close to the zero point. Such an arrangement is disclosed in, for example, U.S. Pat. No. 4,112,291 entitled "Positioning system in a numerically controlled apparatus", issued on Sept. 5, 1978. When the numerical control device employed in the system of the type described is placed in the zero-point return mode, the movable element is quick-fed toward the zero point until the zero-point return dog, carried on the movable member, presses against the deceleration limit switch. At the instant this occurs, the feed rate of the movable element is reduced so that the movable element may approach the zero point at a slower speed. Then, after a predetermined period of time has passed, the dog separates from the limit switch which is therefore allowed to return to its former state. When this occurs, the numerical control device, regarding the initial grid point as the zero point, stops the movable element at this grid point to end the zero-point return operation. The grid points mentioned here are a plurality of points, spaced apart by a pitch L, starting with the zero point. The pitch L ordinarily is two millimeters.

It can be understood from the above that the movable element will not be stopped exactly at the zero point if the installation position of the deceleration limit switch or of the zero-point return dog happens to be shifted in excess of one grid pitch. For example, assume that there is a shift in the installation position of the zero-point return dog so that the deceleration limit switch is restored to its original state between a grid point $G_1$ which is one short of the zero point $G_0$, and a grid point $G_2$ which is two short of the zero point. This will cause the numerical control device to regard the grid point $G_1$ as the zero point, so that the movable element will be stopped at $G_1$. As an attempted solution, one might install the dog or the limit switch in such a manner that the limit switch will be restored to its former state somewhere between the zero point $G_0$ and the grid point $G_1$. However, if the position at which limit switch restoration is achieved is very close to either $G_0$ or $G_1$, a slight change in the contact between the dog and the limit switch, or a change with the passage of time, may shift the limit switch restoration position to a point outside the region defined between $G_0$ and $G_1$. This would make it impossible to achieve a correct zero-point return. A problem of the type described occurs quite often because of the short distance, on the order of two millimeters, between grid points.

It is obvious from the foregoing that the position at which the deceleration limit switch or the zero-point return dog is installed must be so adjusted that the limit switch is restored to its original state at a position approximately midway between the zero point $G_0$ and the grid point $G_1$. It has been conventional practice for the operator to effect such adjustment by a trial and error method in which the operator relies entirely upon his own judgement in mounting the limit switch and dog on the machine and then executes a zero-point return operation to confirm whether it can be accomplished correctly. If not, the switch and/or dog must be remounted. Obviously, this is a complicated and time consuming procedure. In addition, since the position for limit switch restoration will in some cases be extremely close to either the zero point $G_0$ or grid point $G_1$, it is quite likely that a correct zero-point return operation will eventually become impossible for the reason given above.

SUMMARY OF THE INVENTION

Accordingly, an object of the present invention is to provide a method and apparatus for adjusting the installation of switch members such as a zero-point return dog and a deceleration limit switch so as to enable a correct zero-point return operation.

Another object of the present invention is to provide a method and apparatus for adjusting the installation position of switch members such as a zero-point return dog and a deceleration limit switch in such a manner that the deceleration limit switch is restored in state at a position approximately midway between a zero point $G_0$ and a grid point $G_1$.

Still another object of the present invention is to provide a method and apparatus for adjusting the installation position of switch members in a simple and accurate manner.

These and other objects and features of the present invention will be apparent from the following description taken in conjunction with the accompanying drawings, in which like reference characters designate the same or similar parts throughout the figures thereof.

DESCRIPTION OF THE PREFERRED EMBODIMENTS

Figure 1:
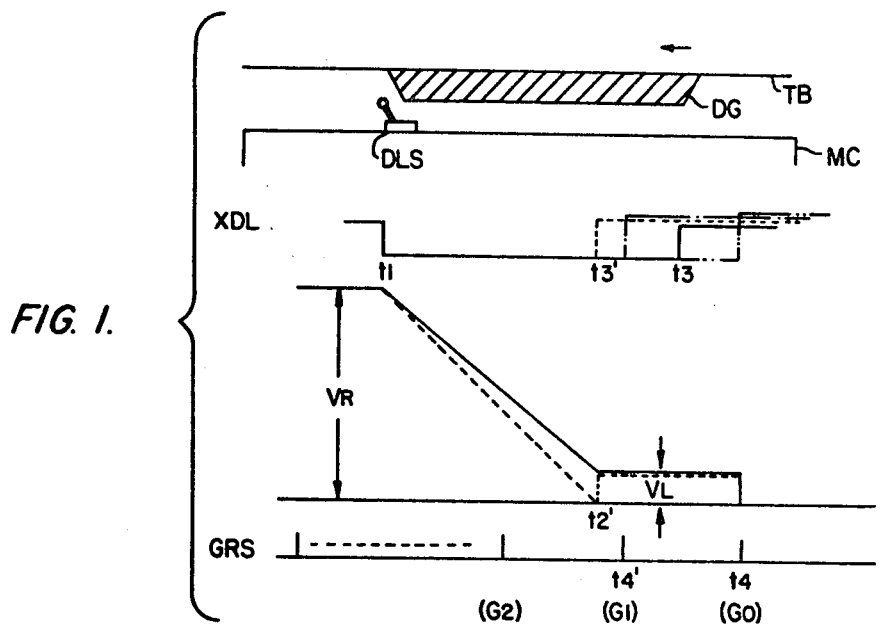
FIG. 1 is a timing chart useful in describing a zero point return method in a numerically controlled machine tool.
Figure 2:
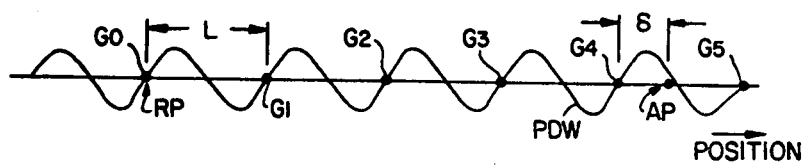
FIG. 2 is an illustrative view useful in describing grid points.

Reference will first be had to FIGS. 1 and 2 to describe, in general terms, a zero point return operation in a numerically controlled machine tool which employs a resolver or the like. In the present arrangement we will assume that a zero-point return dog DG is provided on a movable member, namely a table TB, of the machine, and that a deceleration limit switch DLS is provided in close proximity to the zero point of a stationary portion MC of the machine. When the system is placed in the zero-point return mode, the table TB is quick-fed at a speed $V_R$ toward the zero point. At time $t_1$ (FIG. 1), when the dog DG reaches the vicinity of the zero point and actuates the deceleration limit switch DLS, an X-axis deceleration signal XDL obtained from the limit switch goes to logical "0", as shown in FIG. 1. The zero-point return speed is reduced in response to the trailing edge of the deceleration signal XDL and may follow either the solid or dotted line. In the case of the solid line, the zero-point return speed attains a value of $V_L$ after a predetermined period of time, namely at time $t_2$, which speed is low enough for the drive motor to be stopped instantaneously. In the case of the dotted line, the zero-point return speed first drops to zero at time $t_2$ and then is elevated to the speed $V_L$.

Then, in both cases, the table TB is moved toward the zero point at the speed $V_L$ from said point in time $t_2$. Since the dog DG separates from the deceleration limit switch at time $t_3$, the limit switch is restored to it original state, so that the deceleration signal XDL goes to logical "1". When the deceleration limit switch DLS is restored to its original state, the numerical control device considers the very next grid point (a point at which a grid signal GRS is generated, as will be described later) to be the zero point, whereby the table TB is brought to a stop at time $t_4$ (grid point $G_0$ in the present case) to end the zero-point return operation.

Reference will now be had to FIG. 2 for a better understanding of the grid points mentioned above. In general, a resolver is adapted to generate a position signal as it revolves, one period of the position signal corresponding to one revolution of the resolver. Thus, if we let one revolution of the resolver be equivalent to an amount L (mm) of table movement, and if we plot the position of the table along a horizontal axis, then each period of the position signal, which is designated PDW, will correspond to the unit of table movement L, as shown in FIG. 2. The points $G_0$, $G_1$ $G_2$, $G_3$ and so on where the position signal PDW crosses the zero line are referred to as grid points, one grid point occurring every unit of movement L.

It should be obvious from the foregoing that the table TB will not come to rest exactly at the correct zero point if either the acceleration limit switch DLS or zero-point return dog DG is accidentally shifted from the correctly installed position by an amount in excess of one grid pitch. For example, assume that there is a shift in the position at which the zero-point return dog DG is installed so that the deceleration signal XDL goes to logical "1" at time $t_3'$, as depicted by the dotted line in FIG. 1. When this occurs, the table TB is stopped at time $t_4'$, namely at the grid point $G_1$ which is one grid point short of the zero point $G_0$, and the numerical control device will assume mistakenly that $G_1$ is the zero point. In such an event it may be attempted to correctly install the dog or the limit switch in such a manner that the deceleration signal XDL will attain the "1" logic level between the grid points $G_0$ and $G_1$. However, if this should occur at a position extremely close to either of these grid points, as illustrated by the one-dot-and-dash and two-dot-and-dash lines in FIG. 1, a slight change in the contact between the dog and the limit switch, or a change with the passage of time, may shift the position at which the signal XPL goes to logical "1" to a point outside the $G_0$, $G_1$ region. This would again make it impossible to achieve a correct zero-point return. When one considers that the distance between grid points is as small as two millimeters, it may be appreciated that errors in the zero-point return operation are quite common.

The present invention, which seeks to solve the problem described above, will now be described with reference to FIGS. 3 and 4. In the discussion that follows, movement will be described solely along the X-axis for the sake of simplicity.

Figure 3:
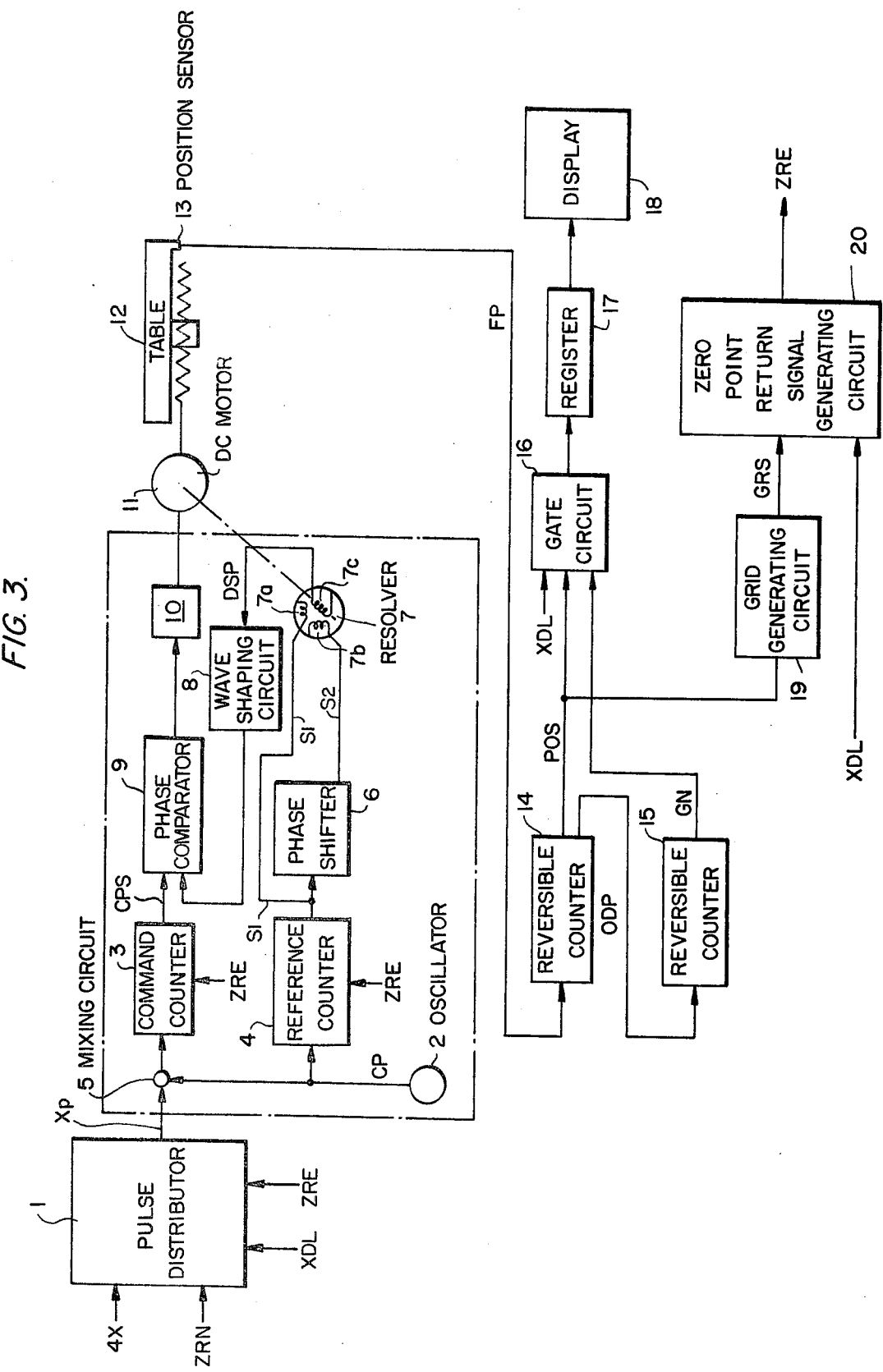
FIG. 3 is a block diagram illustrating an embodiment of the present invention with reference to control along an X-axis only.

In FIG. 3, a pulse distributor 1 generates distributed pulses $X_p$ by performing a pulse distribution operation on the basis of an incremental position command $\Delta X$ or zero return signal ZRN. An oscillator 2 generates a pulse train $C_p$ of a constant frequency. The distributed pulses $X_p$ from the pulse distributor 1 and the pulse train $C_p$ from the oscillator 2 are applied to a mixing circuit 5 which is adapted to mix the pulses $X_p$, $C_p$. A command counter 3 counts up the pulses $X_p$, $C_p$ received from the mixing circuit 5 and generates a command phase signal CPS which emerges from the flip-flop stage constituting the most significant bit. A reference counter 4, having the same capacity as the counter 3, counts the pulses $C_p$ received from the oscillator 2 and generates a signal $S_1$ which emerges from the flip-flop stage constituting the most significant bit. A phase shifter 6, which receives the signal $S_1$ from the reference counter 4, produces a signal $S_2$ which is the result of advancing or retarding the phase of signal $S_1$ by $\pi/2$. The signals $S_1$, $S_2$ are delivered to a resolver 7 which includes stator windings 7a, 7b arranged with an angle of $\pi/2$ or 90° between them, and a rotor winding 7c which rotates in accordance with the rotation of a DC motor 11 for driving a movable member, which will be taken as a table in the preferred embodiment. The inputs to the stator windings 7a, 7b are the signals $S_1$, $S_2$, respectively, while the rotor winding 7c produces a detection phase signal DSP, the phase of which is shifted by the angle of rotation $\theta$ of the rotor winding. The signal DSP is applied to a wave shaping circuit 8 such as a Schmitt trigger, the output of the wave shaping circuit being coupled to a phase comparator 9 whose other input is the command phase signal CPS from the command counter 3. The phase comparator 9 detects the phase difference between the command phase signal CPS and the detection phase signal DSP, and produces an output voltage which is proportional to the phase difference. The output voltage is delivered to an amplifier 10 whose output is in turn connected to the DC motor 11. Number 12 denotes the table driven by motor 11. A position sensor 13, such as a pulse coder or Inductsyn (tradename), is mounted on the table 12 and is adapted to generate a single feedback pulse FP, which may be a positive (forward direction) feedback pulse or a negative (reverse direction) feedback pulse, depending upon the direction of movement of table 12, the feedback pulse being generated each time table 12 moves by a predetermined amount. A presettable reversible counter 14 receives the feedback pulses FP and has its content counted up or counted down by the pulses in accordance with the direction of table movement, the counter 14 producing an overflow pulse ODP for taking a figure up one place, i.e., for a carry, or for taking a figure down one place, i.e., for a "borrow" operation. A reversible counter 15 has its content counted up or counted down by the pulse ODP.

Assume now that the position sensor 13 generates N-number of pulses during one revolution of resolver 7, that is, during the time it takes table 11 to traverse L millimeters (FIG. 2), and assume that the capacity of reversible counter 14 is N. The reversible counter 15 will then in effect count the number of grid points starting from the zero point RP or $G_0$ (FIG. 2) up to the table position AP, and the reversible counter 14 will count the number of pulses corresponding to a distance $\delta$ measured from a grid point to the table position AP, also as shown in FIG. 2.

A gate circuit 16 receives the deceleration signal XDL produced by the deceleration limit switch, which is not shown, as well as signals POS, GN indicative of the contents of the reversible counters 14, 15, respectively. When the logical state of the deceleration signal XDL changes from "0" to "1", AND circuit 16 opens and delivers, in the form of the signals POS, GN, the values being held in the reversible counters 14, 15 at that instant. These signals enter a register 17 whose output is connected to a display device 18 adapted to display the numerical value stored in the register. The POS signal from reversible counter 14 is applied also to a grid generating circuit 19 which generates a grid signal GRS when the content of counter 14 attains a value of zero. The grid signal GRS is applied to a zero-point return signal ZRE generating circuit 20 whose other input is the deceleration signal XDL. The circuit 20 may have the construction shown in FIG. 4.

Figure 4:
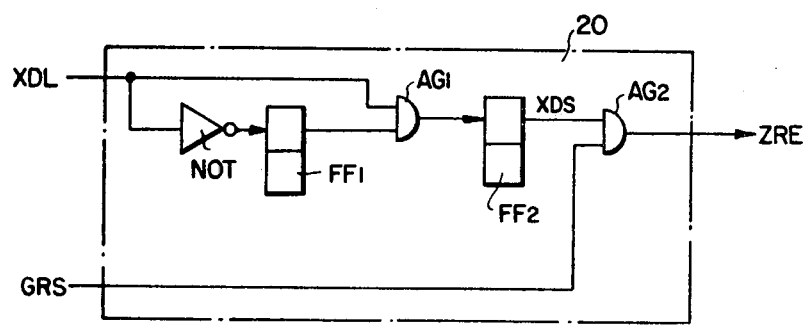
FIG. 4 is a wiring diagram of a circuit for generating a signal indicative of the end of a zero point return operation.

In the arrangement of FIG. 4, flip-flops $FF_1$, $FF_2$ are initially in the reset state. The deceleration signal XDL is applied to the input side of flip-flop $FF_1$ through a NOT gate. An AND gate $AG_1$, whose two inputs are the deceleration signal XDL and the output of flip-flop $FF_1$, has its output connected to the input side of the flip-flop $FF_2$. An AND gate $AG_2$, whose two inputs are the grid point signal GRS and the output XDS of flip-flop $FF_2$, delivers the zero-point return signal ZRE mentioned above.

In FIG. 3, the pulse distributor 1, oscillator 2, command counter 3, reference counter 4, phase shifter 6, resolver 7, wave shaper 8, amplifier 10 and DC motor 11 construct a well-known phase comparison-type closed loop servo circuit. It should be noted again that the circuit of FIG. 1 is for control along only one axis, namely the X-axis. In actual practice, circuits of identical construction are provided for each controlled axis.

The operation of the invention will now be described with reference to FIGS. 3 and 4.

(A) Positioning operation

The phase comparison-type closed loop servo circuit drives the DC motor 11 by generating an analog voltage, delivered by the phase comparator 9, which is in accordance with the phase difference between the command phase signal CPS produced by the command counter 3 and the detection phase signal DSP produced by the resolver 7, and by applying this voltage to the DC motor 11 upon amplification by amplifier 10. As the DC motor rotates, the rotor winding 7c revolves so that the phase of detection phase signal DSP is shifted in accordance with the amount of rotation, the circuit operating to bring the phase of signal DSP into coincidence with the phase of signal CPS. In other words, the servo circuit drives the motor 11, which in turn transports the table 12, in such a manner that the phase difference between the signals DSP, CPS approaches zero. The servo circuit stops driving the motor when the phase difference is reduced to zero.

During the operation of the servo circuit, the position sensor 13 mounted on table 12 is generating the positive or negative feedback pulses FP in accordance with the direction of table movement, each pulse being generated whenever the table moves by a predetermined amount. The feedback pulses enter the reversible counter 14. The content of reversible counter 14 is up-counted by positive feedback pulses and down-counted by negative feedback pulses, again in accordance with the direction of table movement, and delivers the pulse ODP whenever a predetermined number of feedback pulses have arrived. The pulse ODP acts as a carry pulse which up-counts reversible counter 15, or as a borrow pulse which down-counts reversible counter 15. Accordingly, if it is arranged for the counters 14, 15 to have a content of zero at the zero point, such content will always be an indication of the current position of the table.

(B) Zero-point return operation

The zero-point return signal ZRN is produced when the operator manipulates the proper switch on a control panel, which is not shown. The pulse distributor 1 responds to the signal ZRN by producing distributed pulses $X_p$ for a rapid traverse to fast-feed the table 12 toward the zero point from its current position on the X-axis. When the table 12 reaches the vicinity of the zero point and the zero-point return dog DG presses against the deceleration limit switch DLS, the logical state of the X-axis deceleration signal XDL changes from "1" to "0". As a result, the flip-flop $FF_1$ in FIG. 4 is set, and pulse distributor 1 lowers the pulse distribution rate so that the speed at which the table 12 is being transported is slowed down to the reduced speed $V_L$. From then on the table approaches the zero-point at speed $V_L$ until the dog DG separates from the deceleration limit switch DLS. At such time the switch DLS is restored to its former state, so that the deceleration signal XDL reverts back to logical "1". The "1" logic of signal XDL opens the gate circuit 16 so that the present table position stored in counters 14, 15 is transferred to register 17 for display on display device 18. The "1" logic of signal XDL is applied also to the circuit 20 and causes AND gate $AG_1$ in FIG. 4 to deliver a "1", thereby setting flip-flop $FF_2$. Thereafter, table 12 continues being moved at the speed $V_L$ until the content POS of reversible counter 14 attains a value of zero, indicating that the table has arrived at the grid point $G_0$. At this time, the grid signal generating circuit 19 produces the grid signal GRS of logical "1", so that AND gate $AG_2$ delivers the signal ZRE for ending the zero-point return operation. The signal ZRE stops the table 12 instantaneously, resets the command counter 3 and the reference counter 4, and causes the pulse distributor to halt the pulse distribution operation.

(C) Adjustment of zero-point return dog or deceleration limit switch

When the zero-point return operation is ended in the manner described above, the display device 18 presents a display of the information which was held in the reversible counters 14, 15 at the instant that the X-axis deceleration signal XDL reverted to logical "1". In other words, display device 18 indicates what the position of the table 12 was when signal XDL changed from "0" to "1". The operator, therefore, merely by observing the numerical value indicated by the display device 18, can determine whether the position at which signal XDL reverted to logical "1" is between the grid point $G_0$, which is the zero point, and the next grid point $G_1$, and furthermore, whether said position is midway between $G_0$ and $G_1$. If the display device 18 indicates that said position is not located between the points $G_0$, $G_1$, or is not located midway between them, the operator adjusts the position of the dog DG or of the limit switch DLS and then performs the zero-point return operation afresh in the manner described above. When the operator has confirmed that the position at which signal XDL reverts to logical "1" lies approximately midway between the grid points $G_0$, $G_1$, no further adjustment of the dog or limit switch is necessary. It should be noted in the foregoing that the content of reversible counter 15 will be zero and that of reversible counter 14 will be N/2 when the position at which XDL reverts to logical "1" is midway between the grid points $G_0$, $G_1$, these values being displayed on the display device 18 for confirmation by the operator. Thus the operator is assisted by the value shown on display device 18 and need not rely solely upon guesswork in positioning the dog or limit switch.

Figure 5:
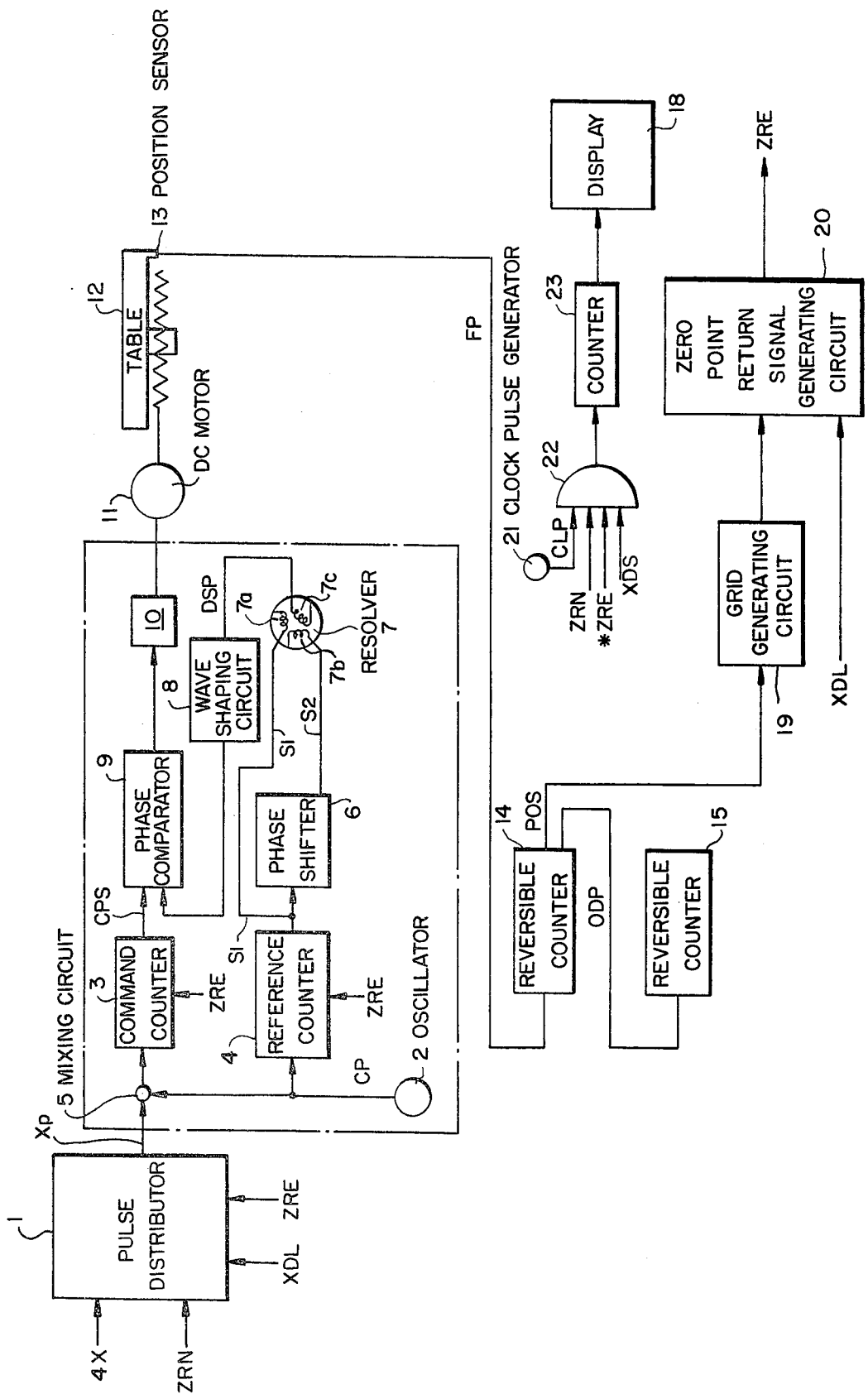
FIG. 5 is a block diagram illustrating another embodiment of the present invention.

FIG. 5 illustrates a block diagram of another embodiment of the present invention. Parts identical with those in the arrangement of FIG. 3 are denoted by like reference characters and are not described again here. Whereas the embodiment illustrated in FIG. 3 presents a display of the position at which the X-axis deceleration signal XDL goes to logical "1", the embodiment of FIG. 5 is arranged to display the time required to complete the zero-point return operation from the instant at which signal XDL goes to logical "1".

In FIG. 5, numeral 21 denotes a clock pulse generator for generating clock pulses CLP. These pulses are applied to an AND gate 22 whose other inputs are the signals ZRN, ZRE and XDS. With signal ZRN at logical "1", indicating the zero-point return mode, AND gate 22 is open from the instant signal XDL changes from "0" to "1" (i.e., from the instant XDS goes to logical "1" in FIG. 4) until the zero-point return operation ends, namely when signal ZRE goes to logical "1". During this interval the clock pulses CLP are delivered to a counter 23 where they are counted. In other words, counter 23 in the embodiment of FIG. 5 is adapted to count the clock pulses CLP generated by clock pulse generator 21 from the moment the X-axis deceleration signal XDL reverts to logical "1" until the table returns to the zero point. The number of pulses N counted by the counter 23 is displayed on display device 18. If we assign the clock pulse frequency a value of, say, 1000 pulses per second, the display device 18 will display a value representing N milliseconds. It will be recalled that the table 12 is transported at the constant speed $V_L$ from the instant XDL goes to logical "1" until the end of the zero-point return operation. Accordingly, the time T from said instant until the moment the table is stopped is proportional to the distance l between the point at which XDL goes to logical "1" and the zero point. Thus, the interval of time T can be expressed as the distance l divided by the speed $V_L$, or $T = l/V_L$. Accordingly, letting the time for table movement from grid point $G_1$ to the zero point (grid point $G_0$) be $T_0$, the time T should be $T_0/2$. In accordance with this embodiment then, the zero-point return dog DG or the limit switch DLS should be positionally adjusted to establish the relation $T = T_0/2$.

In the foregoing two embodiments, the current position of the table or the time T is displayed directly on the display device 18. It should be obvious, however, that the present invention is not limited to these arrangements. For example, when necessary the current position or time T can be subjected to a desired arithmetic operation to give a result which may be displayed on the display device. Furthermore, although the present invention as described above is applied to a closed loop of the phase comparison type, it goes without saying that the invention is applicable also to a position control system of the DSCG type (digital sine-cosine generator) that relies upon a resolver or Inductsyn, or to a position control system of the type that relies upon a pulse coder. It is possible also to delete the position sensor 13 in FIGS. 3 and 5 and so modify the arrangement as to sense the current table position by way of the resolver 7.

It should also be noted that the present invention is applicable not only to dog and limit switch adjustment, but can be applied to a wide variety of adjustment operations, such as a stroke end or tool change position adjustment.

As many apparently widely different embodiments of the present invention can be made without departing from the spirit and scope thereof, it is to be understood that the invention is not limited to the specific embodiment thereof except as defined in the appended claims.

What I claim is:

1. A method of adjusting the positions of switch members installed on a machine tool in a numerical control system having a grid signal generating circuit for generating a grid signal pulse whenever a movable member on the machine tool is transported by a predetermined increment of movement, wherein a zero-point return control operation is performed by transporting the movable member toward a zero point when the system is in a zero-point return mode, reducing the speed at which the movable member approaches the zero point when a dog which is installed on the movable member is brought into pressing contact with a deceleration limit switch that responds by immediately producing a deceleration signal, and stopping the movable member in response to the first grid signal pulse generated after the pressing contact between said dog and limit switch ends, which method comprises the steps of:
   reading the current position of the movable member when said deceleration limit switch and said dog move out of pressing contact again;
   displaying said current position; and
   adjusting the position at which at least one of said deceleration limit switch and said dog is installed until determining, on the basis of the displayed current position, when said deceleration limit switch and said dog are installed on the machine tool at predetermined relative positions.

2. The method according to claim 1, wherein the position of the movable member when a grid signal pulse is generated is designated a grid point, and wherein the step of adjusting the position is accomplished by positionally adjusting at least one of said deceleration limit switch and said dog in such a manner that the pressing contact between said dog and limit switch ends at a position midway between a zero reference grid point and a grid point that is one grid point short of the zero reference grid point.

3. The method according to claim 2, further comprising the steps of counting a pulse generated for each predetermined increment of movement of the movable member using a first counter circuit which produces an overflow pulse upon counting N-number of pulses corresponding to the interval between grid points, and counting the overflow pulses using a second counter circuit, the steps of reading the current position and displaying said current position being accomplished by reading and displaying the contents of said first and second counter circuits as the current position of said movable member, and wherein the step of positionally adjusting at least one of said deceleration limit switch and said dog is conducted by adjusting the position at which at least one of said deceleration limit switch and said dog is installed in such a manner that the content of said second counter circuit attains a value of zero and the content of said first counter circuit substantially attains a value of N/2.

4. A method of adjusting the positions of switch members installed on a machine tool in a numerical control system having a grid signal generating circuit for generating a grid signal pulse whenever a movable member on the machine tool is transported by a predetermined increment of movement, wherein a zero-point return control operation is performed by transporting the movable member toward a zero point when the system is in a zero-point return mode, reducing the speed at which the movable member approaches the zero point when a dog which is installed on the movable member is brought into pressing contact with a deceleration limit switch that responds by immediately producing a deceleration signal, and stopping the movable member in response to the first grid signal generated after the pressing contact between the dog and limit switch ends, which method comprises the steps of:
measuring the time from the instant at which the deceleration signal is generated by said deceleration limit switch until the instant at which the movable member is positioned at the zero point;
displaying the measured time; and
adjusting the position at which at least one of said deceleration limit switch and said dog is installed until determining, on the basis of the displayed time, whether said deceleration limit switch and said dog are installed on the machine tool at predetermined relative positions.

5. The method according to claim 4, wherein the position of the movable member when a grid signal is generated is designated a grid point and the time required for the movable member to move a distance corresponding to the distance between two adjacent grid points at the reduced speed is designated T, and wherein the step of adjusting the position is accomplished by adjusting the position at which at least one of said deceleration limit switch and said dog is installed in such a manner that the displayed time substantially attains the value T/2.

6. An apparatus for adjusting the positions of switch members installed on a machine tool in a numerical control system having a pulse coder for generating a pulse whenever a movable member on the machine tool is transported by a first predetermined increment of movement, a grid signal generating circuit for generating a grid signal pulse whenever the movable member is transported by a second predetermined increment of movement larger than said first predetermined increment of movement, and a zero-point return circuit for performing a zero-point return control operation by transporting the movable member toward a zero point when the system is in a zero-point return mode, reducing the speed at which the movable member approaches the zero point when a dog which is installed on the movable member is brought into pressing contact with a deceleration limit switch that responds by immediately producing a deceleration signal, and stopping the movable member in response to the first grid signal pulse generated after the pressing contact between the dog and limit switch ends, which apparatus comprises:
current position storage means included within said grid signal generating circuit for receiving the pulses from said pulse coder and storing the current position of the movable member by counting up and counting down, in accordance with the direction of which the movable member moves, the pulses generated by said pulse coder;
deceleration signal disappearance position storage means connected to said current position storage means for storing the current position of the movable member at the instant the deceleration signal disappears; and
means connected to said deceleration signal disappearance position storage means for displaying the content of the deceleration signal disappearance position storage means.

7. The apparatus according to claim 6, wherein said current position storage means comprises a first counter means connected to said pulse coder for counting the pulses generated by said pulse coder and for producing an overflow pulse upon counting N-number of pulses each corresponding to the distance which the movable member moves during the interval between two grid signal pulses, and a second counter means connected to said first counter means for counting the overflow pulses.

8. The apparatus according to claim 7, wherein said grid signal generating circuit comprises means connected to said first counter means for generating a grid signal pulse when the content of said first counter means has attained a value of zero.

9. An apparatus for adjusting the positions of switch members installed on a machine tool in a numerical control system having a pulse coder for generating a pulse whenever a movable member on the machine tool is transported by a first predetermined increment of movement, a grid signal generating circuit for generating a grid signal pulse whenever the movable member is transported by a second predetermined increment of movement larger than said first predetermined increment of movement, and a zero-point return circuit for performing a zero-point return control operation by transporting the movable member toward a zero point when the system is in a zero-point return mode, reducing the speed at which the movable member approaches the zero point when a dog which is installed on the movable member is brought into pressing contact with a deceleration limit switch that responds by immediately producing a deceleration signal, and stopping the movable member in response to the first grid signal generated after the pressing contact between the dog and the limit switch ends, which apparatus comprises:
a clock pulse generator;
means included within the zero-point return circuit for generating a signal indicating the end of a zero-point return operation;
timer circuit means responsive to said clock pulse generator and said means for generating a signal indicating the end of a zero-point return operation for counting the clock pulses to measure the time from the disappearance of the deceleration signal to the genration of the signal indicating the end of a zero-point return operation; and
means responsive to the timer circuit means for displaying the measured time.

* * * * *

UNITED STATES PATENT AND TRADEMARK OFFICE
CERTIFICATE OF CORRECTION

PATENT NO. : 4,481,588
DATED : November 6, 1984
INVENTOR(S) : Komiya

It is certified that error appears in the above-identified patent and that said Letters Patent is hereby corrected as shown below:

[73] "Ltd." should be --Ltd--.  (Front Page)
Column 7, line 56, "l" (both occurrences) should be --$\ell$--.
Column 8, line 16, "adjust-ment" should be --adjustment--.
Column 10, line 64, "genration" should be --generation--.

Signed and Sealed this

Sixteenth Day of April 1985

[SEAL]

Attest:

DONALD J. QUIGG

*Attesting Officer*  *Acting Commissioner of Patents and Trademarks*